(12) United States Patent
Roth

(10) Patent No.: US 12,307,319 B2
(45) Date of Patent: May 20, 2025

(54) SHOPPING CART/BASKET READER SYSTEMS AND METHODS

(71) Applicant: Avery Dennison Retail Information Services LLC, Mentor, OH (US)

(72) Inventor: Mark Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 86 days.

(21) Appl. No.: 17/788,791

(22) PCT Filed: Dec. 18, 2020

(86) PCT No.: PCT/US2020/066102
§ 371 (c)(1),
(2) Date: Jun. 24, 2022

(87) PCT Pub. No.: WO2021/133684
PCT Pub. Date: Jul. 1, 2021

(65) Prior Publication Data
US 2023/0036947 A1    Feb. 2, 2023

Related U.S. Application Data

(60) Provisional application No. 62/954,461, filed on Dec. 28, 2019.

(51) Int. Cl.
*G06K 7/10*      (2006.01)
*G06Q 20/20*    (2012.01)
*G07G 1/00*      (2006.01)

(52) U.S. Cl.
CPC ..... *G06K 7/10356* (2013.01); *G06K 7/10445* (2013.01); *G06Q 20/208* (2013.01); *G07G 1/009* (2013.01)

(58) Field of Classification Search
CPC ........... G06K 7/10356; G06K 7/10445; G06Q 20/208; G07G 1/009
(Continued)

(56) References Cited

U.S. PATENT DOCUMENTS 7,696,882 B1     4/2010  Rahimi et al.
9,378,484 B1 *   6/2016  Russell .............. G06K 7/10356
(Continued)

FOREIGN PATENT DOCUMENTS

| EP | 0689151 | 8/2003 |
|---|---|---|
| EP | 3364334 | 8/2018 |
| WO | 2019/147675 | 8/2019 |

OTHER PUBLICATIONS

International Search Report and Written Opinion dated Mar. 25, 2021 issued in corresponding IA No. PCT/US2020/066102 filed Dec. 18, 2020.
(Continued)

*Primary Examiner* — Kam Wan Ma

(57) ABSTRACT

A system for reading RFID tags or labels on merchandise in a shopping cart or basket includes a chamber sized and configured to receive a shopping cart or basket. The chamber includes a portal sized and configured to accommodate a shopping cart or basket, along with an associated closure that is movable between open and closed conditions. At least one antenna coupled to an RFID reader is associated with an interior of the chamber and oriented to send signals to and receive signals from RFID tags or labels on merchandise in a shopping cart or basket within the chamber. The chamber and the closure are configured to prevent signals sent to and from RFID tags or labels on merchandise in a shopping cart or basket within the chamber from exiting the chamber. A transport mechanism may be provided to automatically move the shopping cart or basket through the chamber.

22 Claims, 1 Drawing Sheet

(58) Field of Classification Search
USPC .......................................................... 340/10.1
See application file for complete search history.

(56) References Cited

U.S. PATENT DOCUMENTS

| | | | |
|---|---|---|---|
| 2007/0205859 A1* | 9/2007 | Webster | B66B 31/006 340/568.5 |
| 2009/0101713 A1* | 4/2009 | Ulrich | G06Q 10/087 235/383 |
| 2015/0004934 A1* | 1/2015 | Qian | H04W 12/06 455/411 |
| 2015/0054623 A1* | 2/2015 | Thomas | G06K 7/10336 340/10.1 |
| 2016/0117534 A1 | 4/2016 | Roth | |
| 2017/0240359 A1* | 8/2017 | Ishibashi | B65G 17/06 |
| 2019/0188428 A1 | 6/2019 | Ono et al. | |

OTHER PUBLICATIONS

International Preliminary Report on Patentability dated Jun. 28, 2022 issued in corresponding IA No. PCT/US2020/066102 filed Dec. 18, 2020.

* cited by examiner

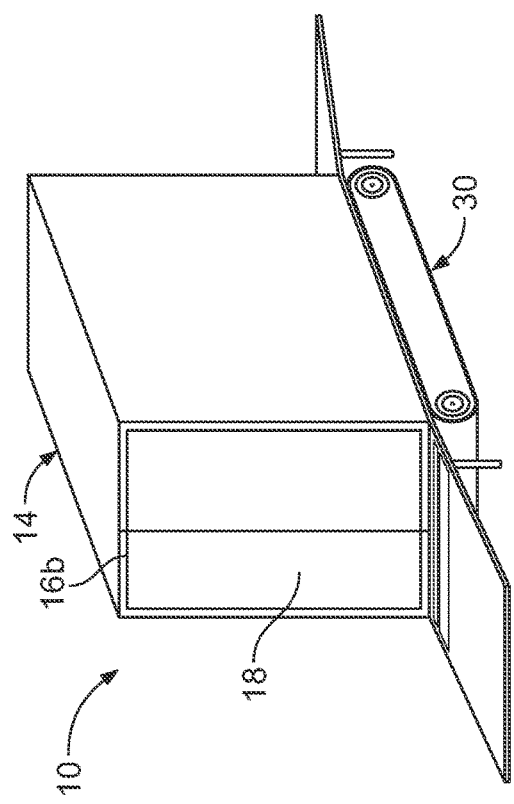
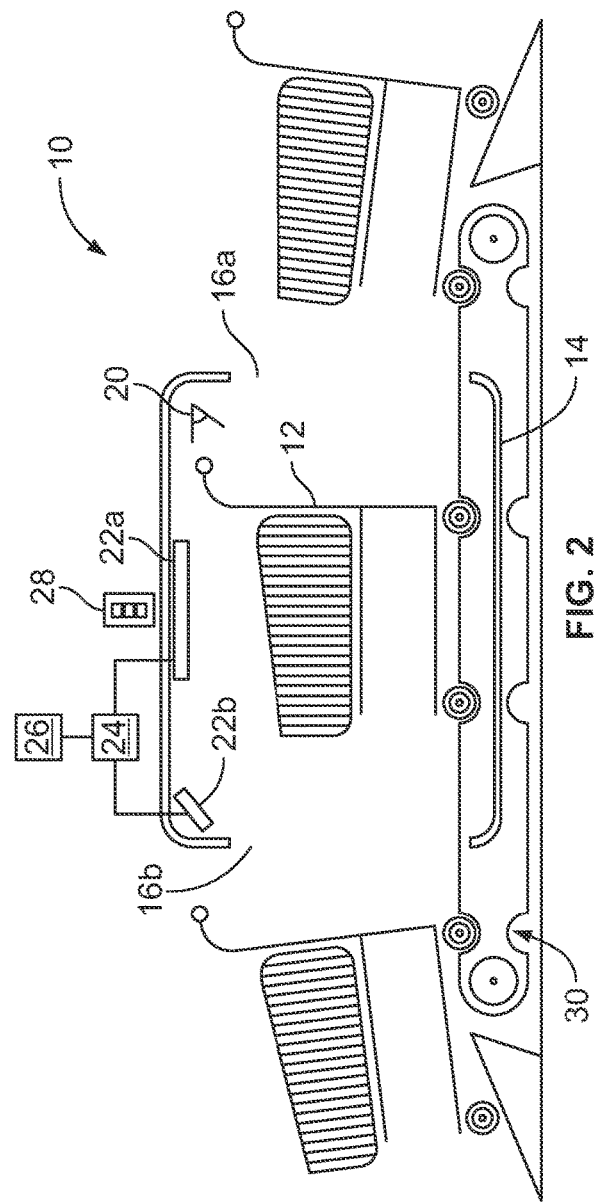

SHOPPING CART/BASKET READER SYSTEMS AND METHODS

CROSS-REFERENCE TO RELATED APPLICATION

The present application is a 371 of International Application No. PCT/US2020/066102, which was published in English on Jul. 1, 2021, and claims the benefit of U.S. Provisional Patent Application No. 62/954,461 filed Dec. 28, 2019, both of which is are incorporated herein by reference in their entireties.

FIELD

The present subject matter relates to checkout systems for shopping carts and baskets and methods of making and using thereof. More particularly, the present subject matter relates to chambers for automatically reading radio frequency identification ("RFID") tags or labels on one or more retail articles or items in a shopping cart or basket.

BACKGROUND

The grocery shopping experience is based on repetitive steps. Shoppers walk up and down the aisles of a grocery store or other retail location, select items from display shelves, place the items into a shopping cart or basket, and bring their cart or basket to the front of the store for checkout and payment.

Checkout counters are typically equipped with barcode scanning hardware. Items that have been selected and placed in the cart or basket by the shopper have to be unloaded onto a counter or conveyor and each item handled again for barcode scanning by a checkout clerk or by the shopper themselves at a self-checkout kiosk. Individual items are transported to the end of the conveyor where they are once again handled and loaded into a shopping bag or cart for transport to the shopper's vehicle. This process requires multiple handling of the articles or items being purchased by the shopper, the employee, and/or both. This is inefficient and requires considerable time for the process to be completed. Moreover, the need to handle/lift heavy items can be cause injury or repeated handling of items can lead to repeated stress injuries for employees. Finally, bar code scanning can be problematic. For example, in self-checkout environments, the bar code scanner may fail to scan the code on the first attempt if the packing is flexible and has creases or wrinkles. Further, the conveyor may not detect an item or items if they are not placed immediately on the conveyor belt but rather carried directly to the bagging area, which is typically done for heavy items which may damages more fragile items if they move down the conveyor and impact the fragile items. This requires an employee to correct the error.

Therefore, there exists a need for an improved shopping system, and methods of making and using thereof, that overcome the problems described above. However, any solution must be practical and economically reasonable to implement. Retailers, particularly grocers, tend to operate on thin margins. Accordingly, it would be advantageous for any new solutions to reuse as much of the existing infrastructure as possible.

One practicable change is to replace barcode scanning technology with RFID technology. With RFID technology, the redundant process requiring multiple touches of grocery items can be eliminated because RFID tags or labels do not require the line of sight restrictions of barcode scanning equipment. Instead, with RFID technology, a radio frequency field is generated by an RFID reader, with the radio frequency field energizing RFID tags or labels within range of the transmitting antenna. The energized RFID tags or labels reply to signals from the antenna with their individual item data, which may include (among other things) the price of the item. Since the retail items or articles do not be specifically positioned in order to be detected, the redundancy of handling items repeatedly can be eliminated.

To control the cost of implementing the change from barcode to RFID technology, an existing point-of-sale terminal may be reconfigured to employ a dual use or dual function device that is capable of both barcode and RFID scanning. The flexibility of such a dual-use device may be advantageous to the extent that it may be impracticable for all items to be provided with an RFID tag or label (e.g., variable weight-price items, such as produce, meats, seafood, cheeses, etc.). Further, a dual use device provides redundacy one scanning technology fails or is inoperative.

While modifying existing in-store infrastructure to include an RFID reader may help to control the cost of implementing RFID technology, it is not a complete solution. For example, any items or articles in a shopping cart must be removed from the cart and placed into the vicinity of the hardware, before being returned to the shopping cart for removal from the store. Accordingly, it would be advantageous to provide a solution that takes full advantage of RFID technology, preferably without requiring the replacement of existing shopping carts and baskets, which are considerable expenses for grocers.

SUMMARY

There are several aspects of the present subject matter, which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

Systems for reading RFID tags or labels on one or more items or articles in a shopping cart or basket are described herein. In some embodiments, the system includes a chamber sized and configured to receive a shopping cart and/or basket. In some embodiments, the chamber includes a portal sized and configured to allow for introduction of a shopping cart and/or basket into the chamber and/or removal of a shopping cart or basket from the chamber, along with an associated closure. The closure can be configured to be moved between an open condition allowing for introduction of a shopping cart or basket into the chamber via the portal and/or removal of a shopping cart or basket from the chamber via the portal and a closed condition covering the portal to prevent introduction of a shopping cart or basket into the chamber via the portal and/or removal of a shopping cart or basket from the chamber via the portal.

In some embodiments, the system is described as above and at least one antenna is coupled to an RFID reader, wherein the reader is associated with an interior of the chamber and is oriented to send signals to and receive signals from RFID tags or labels on the one or more items or articles in a shopping cart and/or basket within the chamber. In some embodiments, the chamber and the closure are configured to prevent signals sent to and from RFID tags or labels on the items or articles in the shopping cart or basket within the chamber from exiting the chamber.

In some embodiments, the shopping cart and/or basket is introduced into the chamber via a transport mechanism. Exemplary transport mechanisms include, but are not limited to, a track system, a belt system, or other system that can move a cart and/or basket. In some embodiments, the transport mechanism introduces the cart and/or basket into the chamber and at a pre-determined point, stops the cart and/or basket. In other embodiments, the transport system continually moves the cart and/or basket through the chamber at a predetermined or predefined speed in order to effectively read the RFID-tagged items. Allowing the cart and/or basket to move through the chamber may allow the RFID-tagged items to be read at a variety of different locations and/or angles in order to ensure that all items are detected. This may be helpful when RFID-tagged items are stacked on top of each other and partially blocking the RFID-tag.

In some embodiments, the system further contains one or more components that can detect or read non-RFID tagged items. Exemplary non-RFID tagged items include produce (e.g., fresh fruits and vegetables, whole or cut), cheese, meats, seafood, etc. In some embodiments, the one or more components are, or include, bar code scanner or QR code scanner that detects or reads the non-RFID tagged items. In other embodiments, the one or more components are, or include, a vision based system, such as a camera or cameras that detects such items.

In some embodiments, methods for reading RFID tags or labels on the one or more items or articles in a shopping cart or basket are described herein. The method includes introducing the shopping cart and/or basket into a chamber via a portal and then closing the portal as described above. Signals are sent to and received from RFID tags or labels on the items or articles in the shopping cart and/or basket, with the signals being prevented from exiting the chamber. The shopping cart and/or basket is then removed from the chamber.

In some embodiments, the chamber is employed with a transport mechanism configured to be actuated to move a shopping cart or basket into the chamber via one of the portals and later move the shopping cart or basket out via a different portal.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 1 is a perspective view of a system for reading RFID tags or labels on one or more items or articles in a shopping cart or basket according to an aspect of the present disclosure; and FIG. 2 is a side cross-sectional view of the system of FIG. 1.

DESCRIPTION OF THE ILLUSTRATED EMBODIMENTS

It is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

FIGS. 1 and 2 show an exemplary system 10 for reading RFID tags or labels on merchandise in a shopping cart 12 or basket. While FIGS. 1 and 2 illustrate a system 10 that is sized and configured for items in a shopping cart 12, it should be understood that the system 10 may be reconfigured to accommodate baskets instead of shopping carts or to accommodate either shopping carts or baskets or both. Indeed, systems according to the present disclosure are not limited to any particularly configured merchandise receptacle, though it may be advantageous for a system to be configured to accommodate conventional receptacles (e.g., shopping carts or baskets), rather than requiring proprietary receptacles, in order to control the cost of implementing such systems.

The system 10 includes a chamber 14 sized and configured to receive a shopping cart 12 and/or basket. As will be described in greater detail, a radio frequency field is created within an interior of the chamber 14, so the chamber 14 is preferably configured to prevent signals traveling within the chamber 14 from exiting the chamber 14. More preferably (and as will be described in greater detail herein), the chamber 14 may be configured to reflect signals traveling within the chamber 14, rather than simply preventing the signals from exiting the chamber 14.

The chamber 14 includes at least one portal or opening or access 16a, which is configured to allow for a shopping cart or basket to be introduced into and/or removed from the interior of the chamber 14. The chamber 14 of FIGS. 1 and 2 includes a second portal 16b, which may be advantageous for improving the flow of merchandise through the system 10, but a single portal 16 may suffice. If multiple portals are provided, one may be designated for moving a loaded cart or basket into the chamber 14, while another may be designated for moving the loaded cart or basket out of the chamber 14. On the other hand, if only a single portal is provided, then it would be used to both load the shopping cart or basket into the chamber 14 and later remove the shopping cart or basket from the chamber 14.

The portals 16a and 16b are shown as being disposed on opposing side walls of the chamber 14, but it should be understood that a portal may be incorporated into any suitable surface of the chamber 14. For example, if the chamber 14 is particularly configured to accommodate baskets (and not shopping carts), a portal may be associated with an upper surface of the chamber 14, which would allow a shopper to lower the basket into the chamber 14 through the portal.

Each portal 16 includes an associated closure 18. For example, a first portal 16a may be associated with a first closure 18 and a second portal 16b may be associated with a second closure 18b. The closure 18 may be variously configured without departing from the scope of the present disclosure, provided that it is capable of moving between an open condition (allowing for introduction of a shopping cart 12 or basket into the chamber 14 via the associated portal 16 and/or removal of a shopping cart 12 or basket from the chamber 14 via the associated portal 16) and a closed condition in which the closure 18 covers the associated portal 16 to prevent introduction of a shopping cart 12 or basket into the chamber 14 via the portal 16 and/or removal of a shopping cart 12 or basket from the chamber 14 via the associated portal 16. In the illustrated embodiment, the closures 18 are configured as doors or flaps that are hingedly or pivotally connected to the chamber 14, which allows the closures 18 to move between open and closed conditions without being dissociated from the chamber 14. In other embodiments, a closure may be differently configured, such as being configured as a lid or cover that is removably associated with a portal 16. If a plurality of portals and closures are provided, all of the closures may be similarly configured or at least two of the closures may be differently configured.

Regardless of the particular configuration of a closure 18, it is configured (similarly to the chamber 14) to prevent signals traveling within the chamber 14 from exiting the chamber 14. As with the chamber 14, it may be advantageous for a closure 18 to not only prevent a radio frequency signal from exiting the chamber 14, but to reflect the signal back into the chamber 14 to create a fuller radio frequency field within the chamber 14.

A closure 18 may be associated with at least one sensor 20. If provided, the sensor 20 may be variously configured without departing from the scope of the present disclosure. In the illustrated embodiment, the sensor 20 is configured to determine when a shopping cart 12 or basket has been moved to a target location within the chamber 14. This may be achieved, for example, by a sensor 20 configured as photo eye (as in FIG. 2), with an infrared beam that is broken or intercepted by a shopping cart 12 or basket positioned at the target location. In another embodiment, the sensor may be configured as a weight scale, which registers the weight of the shopping cart 12 or basket positioned at the target location. In other embodiments, a sensor may be configured to determine when a shopping cart 12 or basket has been moved to a target location outside of the chamber 14, such as adjacent to the entrance portal. When it has been determined that the shopping cart 12 or basket is present at the target location, a suitable automated response may be implemented. For example, if the target location is outside of the chamber 14, the closure 18 may automatically open to allow the shopping cart 12 or basket to be moved into the chamber 14 via the portal 16 associated with the closure 18. If the target location is inside of the chamber 14, the closure 18 may automatically close. If one or more sensors are provided, the system 10 may be configured to implement any of a number of automated responses upon determining that a shopping cart 12 or basket is at a target location, such as generating a radio frequency field within the chamber 14, as will be described in greater detail herein.

The system 10 further includes at least one antenna 22a, which is coupled to an RFID reader 24, as shown in FIG. 2. The antenna 22a is associated with the interior of the chamber 14 and oriented to send radio frequency signals to and receive radio signals from RFID tags or labels on merchandise in a shopping cart 12 or basket within the chamber 14. FIG. 2 shows a pair of antennas 22a and 22b coupled to the RFID reader 24 (by cables, for example), and it may be advantageous for a plurality of antennas to be associated with the interior of the chamber 14 to create a more complete radio frequency field within the chamber 14 and better ensure that all of the RFID tags or labels on merchandise in a shopping cart 12 or basket within the chamber 14 are scanned. It cannot be predicted how RFID tags or labels will be oriented in a shopping cart 12 or basket, so it may be advantageous for at least two of the antennas to be oriented at angles different from one another to also better ensure that all of the RFID tags or labels on merchandise in a shopping cart 12 or basket within the chamber 14 are scanned. Furthermore, as it is possible for different RFID tags or labels to be most readily read by different signals (e.g., signals operating at different frequencies), it may be advantageous for at least two of the antennas to be differently configured (e.g., to emit signals having different frequencies). This may include one or more antennas positioned at or adjacent to a floor or bottom surface of the chamber 14 to ensure that merchandise positioned on the lower shelf of a shopping cart 12 (e.g., cases of beverages or other bulk items) is exposed to radio frequency signals.

When a shopping cart 12 or basket is properly positioned within the chamber 14 (e.g., as determined by a sensor 20) and all of the closures 18 are in their closed conditions, the RFID reader 24 may be actuated to cause the associated antenna(s) 22 to generate a radio frequency field within the chamber 14. If a sensor 20 is provided, this may include the RFID reader 24 being automatically actuated; otherwise, it is also within the scope of the present disclosure for the RFID reader 24 to be manually actuated (e.g., by a shopper or store employee pressing a button to activate the RFID reader 24). The system 10 may include one or more switches or the like associated with each portal 16 or closure 18 to ensure that all of the closures 18 are in their closed condition before beginning a read event.

Some of the signals emitted by the antennas 22 will be received by the RFID tags or labels on merchandise in the shopping cart 12 or basket, which energizes the RFID tags or labels. The energized RFID tags or labels reply to the signals from the antennas 22 with their individual item data, which may include (among other things) the price of the item. Other signals emitted by the antennas 22 will not be directly received by the RFID tags or labels, due to the orientations of the antennas 22 and the RFID tags or labels. If the chamber 14 and closures 18 are configured to reflect the signals emitted by the antennas 22, the signals not directly received by the RFID tags or labels are reflected back into the interior of the chamber 14 by the chamber 14 itself and the closures 18, giving the signals another chance to be received by an RFID tag or label. On account of the radio frequency field being entirely contained within the chamber 14, the RFID reader 24 may be configured to operate at a relatively high power (which may include its maximum power) to better ensure that all of the RFID tags or labels are scanned.

The antennas 22 receive the signals from the RFID tags or labels, with the signals being passed along to a processor 26 (FIG. 2) associated with the RFID reader 24. The processor 26 may be variously configured without departing from the scope of the present disclosure. In one embodiment, the processor 26 may include a microprocessor (which, in fact may include multiple physical and/or virtual processors). According to other embodiments, the processor 26 may include one or more electrical circuits designed to carry out the actions described herein. In fact, the processor 26 may include a microprocessor and other circuits or circuitry. In addition, the processor 26 may include one or more memories. The instructions by which the processor 26 is programmed may be stored on the memory associated with the processor 26, which memory/memories may include one or more tangible non-transitory computer readable memories, having computer executable instructions stored thereon, which when executed by the processor 26, may cause the processor 26 to carry out one or more actions as described herein.

Regardless of the structure of the processor 26, it is configured to execute a plurality of till functions based at least in part on the signals received by the antenna(s) 22 from the RFID tags or labels on the items in the shopping cart 12 or basket within the chamber 14. This may include some or all of the till functions conventionally performed by a cash register (e.g., tabulating the total cost of the merchandise in the shopping cart 12 or basket, implementing discounts, processing payment for the merchandise, etc.).

After the processor 26 has completed its various till functions (or, in alternative embodiments, before the processor 26 has begun to execute any till functions or while the processor 26 is executing one or more till functions), one or more of the closures 18 may be moved to its open condition and the shopping cart 12 or basket may be removed from the chamber 14 via the associated portal 16. In one embodiment, the system 10 may include a display 28 (as shown in FIG. 2), which may provide information regarding the operation of the system 10. This may include, for example, an indicator light or lights and/or a touch screen to indicate that the system 10 is powered on and ready for use, that a read event is in progress, and that checkout is complete.

It will be seen that systems according to the present disclosure greatly improve upon conventional point-of-sale systems by allowing for all of the items in a shopping cart 12 or basket to be scanned without being removed from the shopping cart 12 or basket. This hands-free checkout process may be especially advantageous for merchandise in a shopping cart 12, as conventional point-of-sale hardware (even modified to include RFID technology) cannot accommodate a shopping cart 12. To further enhance the shopping experience, a shopper may transfer the items from a shelf or display into bags or boxes or the like within the shopping cart 12 or basket, thereby placing the items into condition for transfer from the shopping cart 12 or basket (e.g., into their vehicle) without requiring a dedicated bagging station or step. Bags or boxes may be provided by the store, or the shopper may use their own reusable receptacles to eliminate the waste associated with disposable receptacles. The manner in which the shopper packs the shopping cart 12 or basket (including overloading the shopping cart 12 or basket) does not matter, as the radio frequency field created within the chamber 14 will be able to scan all of the RFID tags or labels on the merchandise.

While it is within the scope of the present disclosure for the shopping cart 12 or basket and associated items to remain stationary during a read event, it may be advantageous for them to be in motion during at least a portion of the read event. This is because moving the shopping cart 12 or basket during a read event will expose the RFID tags or labels on the items to signals from different antennas and/or to differently directed signals, which is not possible with a consistent signal path (i.e., when the shopping cart 12 or basket is immobile during a read event), thereby achieving an even higher read rate. However, attempting to manually move a shopping cart 12 or basket through a radio frequency field may not be practical or effective. Shoppers may be hesitant to push a shopping cart 12 through a sealed chamber while being exposed to a focused radio frequency field. Additionally, individuals tend to walk at different speeds, whereas an optimized read rate may be most easily achieved by the shopping cart 12 or basket being moved through the radio frequency field at a controlled rate.

Accordingly, the system 10 may be provided with a transport mechanism 30, as shown in FIGS. 1 and 2. A transport mechanism 30 may be employed with a chamber 14 having a single portal 16 (with the transport mechanism 30 moving the shopping cart 12 or basket into the chamber 14 via the portal 16 and then moving the shopping cart 12 or basket out of the chamber 14 via the same portal 16), but may be preferred for a chamber 14 having at least two portals 16. In such an embodiment, the transport mechanism 30 may be actuated (e.g., by the processor 26 or by some other controller) to move the shopping cart 12 or basket into the chamber 14 via the first portal 16a and later move the shopping cart 12 or basket out of the chamber 14 via the second portal 16b.

The transport mechanism 30 may be variously configured without departing from the scope of the present disclosure, though it may be advantageous for the transport mechanism 30 to be configured to accommodate the shopping carts and/or basket already in use at a grocery store so that new carts and/or baskets are not required. For example, a belt or trolley or track system provided on a floor or bottom surface of the chamber 14 (and optionally extending outside of the chamber 14) may engage a portion of a shopping cart 12 (e.g., its wheels, as in illustrated embodiment) to temporarily secure the shopping cart 12 with respect to the transport mechanism 30 and allow for controlled movement of the shopping cart 12. In other exemplary embodiments, a transport mechanism may include a spur on a chain, which catches the front lower cross member of the frame of the shopping cart 12 to control movement of the shopping cart 12 through the chamber 14.

If provided, the transport mechanism 30 may move the shopping cart 12 or basket through at least a portion of the chamber 14 while the radio frequency field is operative. This may include the sensor 20 determining that the shopping cart 12 or basket is at the target location, followed by the radio frequency field being created and the transport mechanism 30 being controlled to move the shopping cart 12 or basket through the radio frequency field at a controlled rate. The controlled rate may be a uniform speed or a varying speed and may be in a single direction or in different directions, depending on the movement required for an optimized read rate. As noted above, in addition to the transport mechanism 30 moving the shopping cart 12 or basket through at least a portion of the chamber 14, it is also within the scope of the present disclosure for the transport mechanism 30 to move the shopping cart 12 or basket into, through, and out of the chamber 14, as in the illustrated embodiment.

As will be appreciated, systems according to the present disclosure are only configured to scan merchandise having an associated RFID tag or label. It may not be practicable for some merchandise (such as produce that is sold by the pound, with the price depending on the amount being purchased) to include an RFID tag or label. Such items would need to be separately added to the shopper's order, as calculated by the system 10. This may be achieved by removing such items from the shopping cart 12 or basket (either before or after the shopping cart 12 or basket has passed through the chamber 14) and separately processing them (using a barcode reader, for example). These other items may be processed before or after the shopping cart 12 or basket has passed through the chamber 14 or may be processed while the shopping cart 12 or basket is being processed in the chamber 14 (e.g., using a barcode reader incorporated into the chamber 14 and coupled to the processor 26). In one embodiment, the shopping cart 12 or basket may be provided with a removable receptacle for placing items not having an associated RFID tag or label, with the receptacle being removed for separate processing of such items outside of the chamber 14.

In other embodiments, the system further contains one or more components that can detect or read non-RFID tagged items. Exemplary non-RFID tagged items include produce (e.g., fresh fruits and vegetables, whole or cut), cheese, meats, seafood, etc. In some embodiments, the one or more components are, or include, bar code scanner or QR code scanner that detects or reads the non-RFID tagged items. In other embodiments, the one or more components are, or include, a vision based system, such as a camera or cameras that detects such items.

In still other embodiments, retail locations, such as grocery stores, may provide a system adjacent or near the location where variable weight-price items, such as fresh produce, bulk items, etc. are merchandised, such that the consumer can weigh the item at or near the merchandising site, generate a label which can be detected by a component in the system, such as a bar code scanner, etc.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope hereof is not limited to the above description but is as set forth in the following claims, and it is understood that claims may be directed to the features hereof, including combinations of features that are individually disclosed or claimed herein.

What is claimed is:

1. A system for reading RFID tags or labels on one or more items in a shopping cart or basket, comprising:
   a chamber with a processor, the chamber being sized and configured to receive the shopping cart, basket, or combinations thereof, the chamber comprising:
   at least one portal sized and configured to allow for introduction of the shopping cart, basket, or combinations thereof into the chamber or removal of the shopping cart, basket, or combinations thereof from the chamber, and,
   at least one closure associated with each of the at least one portal and configured to be moved between
   an open condition allowing for introduction of the shopping cart, basket, or combinations thereof into the chamber via the portal and/or removal of the shopping cart, basket, or combinations thereof from the chamber via the portal, and
   a closed condition covering the at least one portal to prevent introduction of the shopping cart, basket, or combinations thereof into the chamber via the portal and/or removal of the shopping cart, basket, or combinations thereof from the chamber via the portal;
   an RFID reader;
   at least one antenna coupled to the RFID reader, associated with an interior of the chamber, and oriented to send signals to and receive signals from RFID tags or labels on the one or more items in the shopping cart, basket, or combinations thereof within the chamber,
   wherein the chamber and the closure are configured to prevent signals sent to and from the RFID tags or labels on the one or more items in the shopping cart, basket, or combinations thereof within the chamber from exiting the chamber,
   wherein the processor is configured to determine a presence or absence of the shopping cart or the basket at a target location within the chamber based on detection of the shopping cart or the basket using at least one infrared sensor disposed within the chamber, wherein the processor is configured to trigger the RFID reader to generate a radio frequency field after the at least one closure has been placed in a closed condition and upon determination of the presence of the shopping cart or the basket at the target location within the chamber using the at least one infrared sensor disposed within the chamber; and
   a transport mechanism configured to move the shopping cart or basket through the radio frequency field at a controlled rate while the at least one closure is in a closed condition, the controlled rate having varying speeds and being in different directions.

2. The system of claim 1, wherein the chamber and the closure are configured to reflect signals sent to and from the RFID tags or labels on the one or more items in the shopping cart, basket, or combinations thereof within the chamber.

3. The system of claim 1, wherein said at least one antenna comprises a plurality of antennas.

4. The system of claim 3, wherein at least two of said plurality of antennas are differently configured.

5. The system of claim 3, wherein at least two of said plurality of antennas are oriented at angles different from one another.

6. The system of claim 1, further comprising:
   a second portal;
   a second closure associated with the second portal;
   wherein the transport mechanism is configured to automatically move the shopping cart, basket, or combinations thereof into the chamber via the portal comprising a first portal, through the chamber, and out of the chamber via the second portal;
   the processor being configured to generate a signal causing the at least one closure associated with each of the at least one portals to automatically transition between open and closed conditions based on the presence or absence of the shopping cart or basket at the target location, upon the determination of the presence or absence of the shopping cart or basket at the target location; and
   the processor being associated with the RFID reader and configured to execute a plurality of till functions based at least in part on signals received from the RFID tags or labels on the one or more merchandise in the shopping cart or basket within the chamber, wherein
   the chamber, the closure, and the second closure are configured to reflect signals sent to and from the RFID tags or labels on the one or more items in the shopping cart or basket within the chamber.

7. The system of claim 6, wherein the transport mechanism is configured to be actuated to move the shopping cart or basket through the chamber, including in and out of the chamber.

8. The system of claim 7, wherein the transport mechanism includes a spur on a chain configured to catch a front lower cross member of a frame of the shopping cart, to control movement of the shopping cart through the chamber.

9. The system of claim 1, wherein the chamber at its bottom surface includes a member that engages a portion of the shopping cart to temporarily secure the shopping cart with respect to the transport mechanism and allow for controlled movement of the shopping cart within the chamber.

10. The system of claim 1, further comprising a sensor configured to determine when the shopping cart or basket is positioned at a target location within the chamber and, upon determining that the shopping cart or basket is positioned at the target location, generate a signal configured to cause the closure to automatically move from the open condition to the closed condition and/or to actuate the RFID reader to cause the at least one antenna to begin signals.

11. The system of claim 1, further comprising one or more components for reading non-RFID tagged items.

12. The system of claim 11, wherein the non-RFID tagged items comprise a QR code.

13. The system of claim 11, wherein the non-RFID tagged items are detected visually.

14. The system of claim 1, further comprising a processor associated with the RFID reader and configured to execute a plurality of till functions based at least in part on signals received from the RFID tags or labels on the one or more merchandise in the shopping cart or basket within the chamber.

15. The system of claim 1, further comprising a display configured to provide information regarding operation of the system.

16. A method for reading RFID tags or labels on one or more merchandise in a shopping cart or basket, comprising:
automatically introducing, using a transport mechanism, the shopping cart, basket, or combinations thereof into a chamber via a portal;
determining, by a processor, a presence or absence of the shopping cart or the basket at a target location within the chamber using at least one infrared sensor;
triggering, by the processor, an RFID reader to generate a radio frequency field after the at least one closure has been placed in a closed condition and upon determination of the presence of the shopping cart or the basket at the target location within the chamber using the at least one infrared sensor disposed within the chamber;
causing, by the processor, at least one closure associated with each of the at least one portal to automatically transition between the open and closed conditions based on the presence or absence of the shopping cart or basket at the target location;
communicating, using an antenna associated with the processor, signals to and from RFID tags or labels on the one or more merchandise in the shopping cart, basket, or combinations thereof when the at least one closure associated with each of the at least one portal is in the closed condition while preventing the signals sent to and received from the RFID tags or labels on the one or more merchandise in the shopping cart or basket from exiting the chamber;
automatically removing the shopping cart or basket from the chamber via a second portal of the chamber using the transport mechanism; and
actuating the transport mechanism to move the shopping cart or basket through a radio frequency field at a controlled rate while the at least one closure is in a closed condition, the controlled rate having varying speeds and being in different directions.

17. The method of claim 16, wherein said sending signals to and receiving signals from the RFID tags or labels on the one or more merchandise in the shopping cart or basket includes the chamber reflecting at least one of the signals sent to and/or received from the RFID tags or labels on the one or more merchandise in the shopping cart or basket.

18. The method of claim 16, wherein said sending signals to and receiving signals from the RFID tags or labels on the one or more merchandise in the shopping cart, basket, or combinations thereof includes sending and receiving signals from a plurality of locations within the chamber.

19. The method of claim 16, wherein said sending signals to and receiving signals from the RFID tags or labels on the one or more items in the shopping cart, basket, or combinations thereof includes sending at least two differently configured signals.

20. The method of claim 16, wherein said sending signals to and receiving signals from the RFID tags or labels on the one or more items in the shopping cart, basket, or combinations thereof includes sending at least two differently directed signals.

21. The method of claim 16, further comprising automatically moving the shopping cart or basket through at least a portion of the chamber.

22. The method of claim 16, further comprising automatically executing a plurality of till functions based at least in part on the signals received from the RFID tags or labels on the one or more merchandise in the shopping cart or basket.

* * * * *